Patented Sept. 17, 1940

2,215,215

UNITED STATES PATENT OFFICE 2,215,215

MANUFACTURE OF CERAMIC PRODUCTS

Norbert S. Garbisch, Butler, Pa.

No Drawing. Application January 12, 1938,
Serial No. 184,598

4 Claims. (Cl. 106—11)

The present invention has particular relation to the manufacture of ceramic bodies notably of the more refined types such as porcelain, chinaware, and the like.

One object of the invention is to provide a form of silica which can be obtained at relatively low cost and which when incorporated into ceramic clays results in a body which possesses unusually good characteristics as to workability in the processes of shaping and forming into various articles.

A second object of the invention is to provide a clay material which possesses excellent firing or baking characteristics, and which when baked or fired possesses an unusual degree of translucence.

In the manufacture of ceramic bodies, notably of the type of chinaware and porcelain, it is customary to admix a clay or kaolin with finely ground quartz or silica and feldspar in order to provide a clay mass which can readily be shaped or formed and which will retain its form during the firing or baking operation, and after firing will be relatively translucent and vitreous. The silica or quartz employed in the clay body is usually in the form either of sand or potter's flint. Its primary function is to react with the other constituents in the mass to provide a glassy matrix. It also renders the plastic bodies more readily workable under the potter's tools, and helps to maintain the shape of the mass during firing. The feldspar acts as a flux to promote vitrification of the mass during firing.

The present invention involves the use of certain siliceous bodies resulting from the grinding and polishing of glass as compounding ingredients for admixture with clay or kaolin in the manufacture of ceramic bodies. Suitable siliceous materials for use in connection with the present invention are obtained in the grinding and polishing operations conducted upon plate glass. In such processes ordinary sand in admixture with water is employed as an abradant and is forced against and moved over the surface of the glass to be ground and polished by means of suitable cast iron blocks or runners. During the grinding and polishing operation the surface of the glass is gradually worn down and small flakes of iron are chipped or abraded from the surface of the runner bars. Simultaneously the grains of sand are gradually worn away or broken up, and from time to time the slurry and mixture of the water and sand is passed through a suitable classifier in which the coarser particles are separated from the finely divided particles. The coarse material is recycled while the final material is advanced to subsequent stages of the grinding or polishing line, in order to make the finer cuts upon the surface of the glass. Ultimately all of the sand is reduced to an exceedingly fine state of subdivision and cannot longer be used in the grinding and polishing operation. Heretofore it has been regarded as a waste material and has been discarded in enormous quantities.

It has now been discovered that this exceedingly finely ground quartz or silica after suitable treatment is of outstanding merit for admixture with argillaceous materials employed in the manufacture of pottery, in order to improve the workability, firing characteristics of the batch and the translucency and appearance of the finished product resulting from the firing or burning of the bodies formed from the material.

If the waste sand is to be employed as a substitute for flint in pottery, it is preferable to conduct the grinding operation with relatively pure sand of a grade comparable to that usually employed in the compounding of glass. This is in contrast to conventional practice in which highly impure river sands are employed as an abrasive. A satisfactory sand after it has been employed in the grinding operation will contain approximately:

| | Parts |
|---|---|
| Silica | 94.0 |
| Alkali | 2.6 |
| Lime and magnesia | 2.8 |
| Aluminum | 0.4 |

In preparing the sand for use in compounding of ceramic bodies the glass debris and the iron contained therein may be removed by suitable methods. For example, the major portion of the glass may be readily taken out by digesting the waste sand with an alkali such as sodium carbonate, sodium hydroxide, or sodium silicate. In conducting the digestion, the sand from the grinding and polishing operation is first settled or filtered in order to reduce the amount of water admixed therewith. A sludge or cake containing about 50 per cent of water, more or less, may thus be obtained and this is then admixed with the alkaline substance employed in the digestion. If sodium hydroxide is employed, the concentration in the liquid phase of the siliceous mass should be about 5 to 10 per cent. If sodium carbonate is employed the concentration may amount to from 10 to 15 per cent. Digestion may be conducted at room temperature, but the reaction is more rapid if conducted at a somewhat elevated temperature, for example, at or near the boiling point of water. If suitable pressure apparatus is employed it may be further speeded up by conducting the reaction at even higher temperatures. As a result of this treatment the glass is preferentially dissolved with but comparatively slight attack upon the silica constituting the main portion of the mass. After sufficient digestion the finely pulverized sand is then filtered off and washed in order to remove excess alkali.

Subsequently the iron is removed by any convenient process, for example by further admixing the sand with a dilute acid such as hydrochloric acid or sulphuric acid. In this operation a concentration of about 5 to 10 per cent of acid is sufficient. When the iron is digested the free acid and the soluble salts are removed by filtration and washing of the slurry. As much of the water as can be removed mechanically is then eliminated and a portion of or all of the remainder may be eliminated by evaporation. Final drying may be conducted at a temperature of about 200 to 500 degrees F. However, it is manifest that for admixture with clay complete drying is not required because the clay is normally admixed with water and usually contains considerable amounts of hydrated materials. It is quite possible to incorporate all or a portion of the water required in order to render the clay plastic with the pulverized sand.

The resultant material is very white and is so fine that most of it will pass through a 325 mesh screen and the average particle size seems to be of the order of 20 microns. While the removal of the glass debris from the finely divided silica has been specifically described this in many instances is not required. Instead the iron may be removed from the siliceous mass as it is obtained from the polishing and grinding of glass by suitable treatment. Such treatment may involve magnetic separation to remove the metallic iron, followed by treatment with dilute (e. g., 5 or 10 per cent hydrochloric or sulfuric) acid to remove any residual iron not taken out by the magnetic separator.

The finely divided glass which may constitute 10 or 25 per cent of the total solids is in an exceedingly uniform state of distribution and in fact is much more uniformly disseminated in the silica than can be obtained by any other method of admixture. The reason for this uniformity will be apparent when it is considered that in grinding the glass, the layer of sand between the runner block and the glass plate is very thin —probably little more than a grain thick. Accordingly each individual grain is afforded an opportunity of abrading away chips of glass so that along with each bit of silica there are also bits of glass. The glass is, therefore, in as uniform admixture with the particles of silica as it is possible to attain by mechanical process. The finely divided and uniformly distributed glass probably even assists in forming a vitreous translucent mass and permits subtsantial reduction or even elimination of the feldspar that otherwise would be required in pottery bodies.

A wide range is permissible in the selection of and proportioning of the various ingredients which may be employed in compounding a clay mass in accordance with the provisions of the present invention. For example, in the preparation of a mass suitable for use in the fabrication of chinaware, the following materials and proportions were employed:

| | Parts |
|---|---|
| Pulverulent quartz which is prepared in accordance with the provisions of the present invention and may still contain the glass debris | 45 |
| Feldspar | 5 |
| Clay mixture consisting of ordinary clay 15 per cent and ball clay 35 per cent | 45 |
| Kaolin | 5 |

Maturing, refining, mixing of the materials, modeling into desired shapes and firing, or baking are all essentially the same as employed with ordinary materials containing potter's flint.

In still another example the formulation was as follows:

| | Per cent |
|---|---|
| Clay body | 57 |
| Sand recovered from the grinding and polishing of glass and containing the glass debris | 23.7 |
| Flint (ground) | 19.3 |

The resultant materials when properly admixed with each other and with water in suitable amount possess excellent plasticity coherence and other properties which make for workability of the mass. Of course it is impossible to determine quantitatively the workability of such material, but the property is readily observable by the workmen skilled in the art. Bodies shaped from the material have a very broad range of vitrification and possess excellent firing characteristics in every respect and the product after firing is characterized by outstanding translucency. For example, it is found to be four to five times as translucent as chinaware bodies in which ordinary potter's flint is employed. An example of the latter body is of the following composition:

| | Parts |
|---|---|
| Kaolin | 31.5 |
| Ball clay | 15 |
| Potter's flint | 35 |
| Feldspar | 15 |
| Dolomite | 3.5 |

The surfaces of the bodies after firing also have satin-like appearane of great artistic appeal and for many purposes do not require a glaze. However, where a vitreous surface is required a glaze can easily be applied. In such glazes pulverulent silica prepared as above described by abrasion of glass with sand may be employed in combination with other ingredients to form a slip suitable for the purpose. The following is a typical composition for the purpose:

*Typical glaze for pottery*

| | Parts |
|---|---|
| Red lead | 14.6 |
| Borax | 18.3 |
| Saltpeter | 4.5 |
| Whiting | 7.0 |
| Zinc oxide | 5.2 |
| Clay | 24.4 |
| Processed silica as described herein | 26.0 |

*Example of a typical sheet steel enamel ground coat frit*

| | Parts |
|---|---|
| Cobalt oxide | 0.342 |
| Manganese oxide | 1.00 |
| Borax | 20.71 |
| Soda niter | 2.07 |
| Soda ash | 4.12 |
| Saltpeter | 5.56 |
| Fluorspar | 3.10 |
| Clay | 10.22 |
| Processed silica as described herein | 52.90 |

The reasons for the improved workability of the material and particularly of the outstanding translucency of the resultant product has not been definitely established. However, it is possible that the improvements are due at least in part to the exceedingly fine state of subdivision of the siliceous mass obtained from the grinding and polishing operations. This subdivision results in very thorough and intimate admixture of the quartz or silica with the argillaceous material and therefore promotes the formation of a uniformly distributed vitreous skeleton throughout the mass. It is also possible or probable that during the long course of the grinding and polishing operations, together with the intermediate stages of classification, and in the subsequent purification of the siliceous mass, the sand and the glass contained therein become partially hydrated or otherwise chemically altered to such extent that they assume new characteristics when incorporated into the argillaceous material. In any event the present invention is not dependent upon any specific explanation of the inherent reasons upon which the process is based.

Although only the preferred forms of the invention have been shown and described it will be apparent to those skilled in the art that numerous modifications may be made therein without departure from the spirit of the invention or the scope of the appended claims.

What I claim is:

1. A process of manufacturing translucent ceramic bodies, which process comprises grinding glass by means of sand of the purity of glass batch sand as an abrasive, thereby providing a mixture of pulverulent silica and glass of a particle size, such that substantially all of it will pass through a screen of 325 mesh, washing the pulverulent material with dilute mineral acid, then mixing it with clay to form a plastic, coherent mass in which the clay constitutes about 50 per cent of the whole, shaping the masses into bodies of desired form and baking them until the bodies are vitrified to hard translucent state.

2. A process of manufacturing pottery of the quality of high grade china, porcelain and the like in which process a glass plate is surfaced by means of a slurry of sand of the purity of glass batch sand as an abrasive to provide a pulverulent mixture of silica and glass of a particle size such that substantially all of it will pass through a screen of about 325 mesh, washing the pulverulent material with dilute mineral acid, washing out any soluble salts from the treatment of the material with acid, then mixing it with pottery clay to form plastic coherent masses in which the clay constitutes about 50 per cent of the whole, shaping the masses into bodies of desired form and baking them into hard, relatively vitreous state.

3. A process of preparing ceramic wares comparable in quality to corresponding china and porcelain wares obtained from pottery bodies comprising about 50 per cent of clay, such as china clay, kaolin and the like, admixed with potter's flint and feldspar, which process comprises replacing at least a substantial proportion of the feldspar and potter's flint in said bodies with waste sand from the surfacing of glass with sand of glass batch purity as an abrasive, the waste sand being an intimate and finely-divided mixture of broken-up grinding sand and glass substantially free of iron from the glass surfacing runner bars and being of a particle size to pass a screen of 325 mesh, thereby forming a plastic, highly workable pottery body, said body after addition of the mixture being modeled to desired form and fired to the hard state of china, porcelain and the like wares.

4. A process as defined in claim 3 in which the ware after the firing operation is provided with a glaze coating.

NORBERT S. GARBISCH.